July 7, 1953         J. R. BAKER ET AL         2,644,670
EXPANSIBLE DRILL BIT AND CUTTER BLADE
Filed Oct. 30, 1950                             2 Sheets-Sheet 1

INVENTORS.
JOHN R. BAKER,
EARNEST H. CLARK, JR.
By
Mellin and Hanscom
ATTORNEYS

July 7, 1953  J. R. BAKER ET AL  2,644,670
EXPANSIBLE DRILL BIT AND CUTTER BLADE
Filed Oct. 30, 1950                                           2 Sheets-Sheet 2
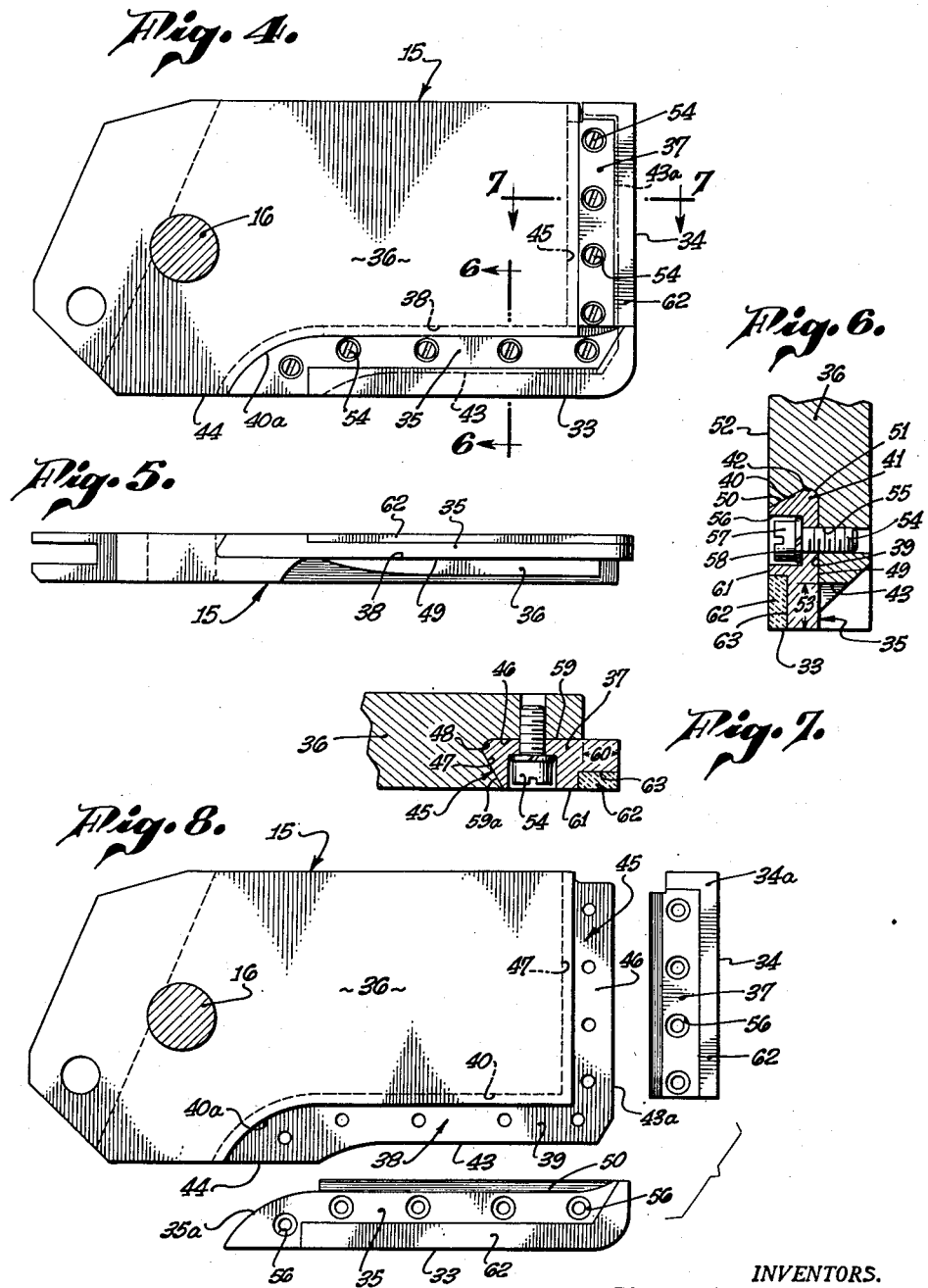
INVENTORS.
JOHN R. BAKER,
EARNEST H. CLARK, JR.
By Mellin and Hanson
ATTORNEYS Patented July 7, 1953

2,644,670

UNITED STATES PATENT OFFICE 2,644,670

EXPANSIBLE DRILL BIT AND CUTTER BLADE

John R. Baker, Pasadena, and Earnest H. Clark, Jr., Huntington Park, Calif., assignors to Baker Oil Tools, Inc., Vernon, Calif., a corporation of California Application October 30, 1950, Serial No. 192,980

8 Claims. (Cl. 255—61)

The present invention relates to drill bits, and more particularly to bits useful in the drilling of well bores, and embodying drag type cutter blades.

In the drag type of rotary drill bits, particularly drill bits embodying expansible cutter blades, it is highly desirable to have the blades hard and resistant to bending. In expansible drill bits of the specific kind illustrated in United States Patent No. 1,857,616, for example, cutter blades are shifted in a main body slot between retracted and expanded positions. In the event a blade bends while in its expanded position, its retraction into the body slot may be prevented, resulting in inability to withdraw the bit from the well bore.

Heretofore, limitations have been placed upon the degree of hardness of the blades, in view of the necessity for providing blade materials to which hardfacing substances, such as tungsten carbide, could be properly welded along the cutting margins of the blade. At times, the blades would bend, with resultant inability to effect their retraction, above noted. The use of blade materials of greater hardenability provided less weldability of the hardfacing materials thereto, with accompanying decrease in the effective cutting life of each blade.

Accordingly, an object of the present invention is to provide a rotary drill bit having one or more cutter blades possessing greater resistance to bending and breaking.

Another object of the invention is to provide cutter blades in a rotary drill bit which will break before bending, in the event that abnormal loads are placed upon them; so as not to interfere with retraction of the blades in an expansible type of bit from their expanded positions.

A further object of the invention is to provide a cutter blade construction having a greater degree of hardenability, while still possessing appropriate weldability for securing hardfacing materials to its cutting edge or edges.

Yet another object of the invention is to provide a cutter blade construction having greater impact resistance.

Still a further object of the invention is to provide cutter blades for rotary drill bits that stay sharp longer, and which, therefore, are capable of drilling a greater footage in a well bore before becoming dull.

Another object of the invention is to provide a cutter blade that is cheaper to maintain in sharp condition. In place of requiring rebuilding by welding and subsequent heat treatment, the cutting edges are provided by separate inserts that are readily replaceable on the main body of the blade.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Fig. 4 is a front elevation, on an enlarged scale, of the leading face of one of the cutter blades;

Fig. 5 is a bottom plan view of the cutter blade disclosed in Fig. 4;

Fig. 6 is an enlarged fragmentary cross-section taken along the line 6—6 on Fig. 4;

Fig. 7 is an enlarged fragmentary cross-section taken along the line 7—7 on Fig. 4;

Fig. 8 is an exploded front elevational view of the cutter blade shown in Fig. 4.

Figure 1:
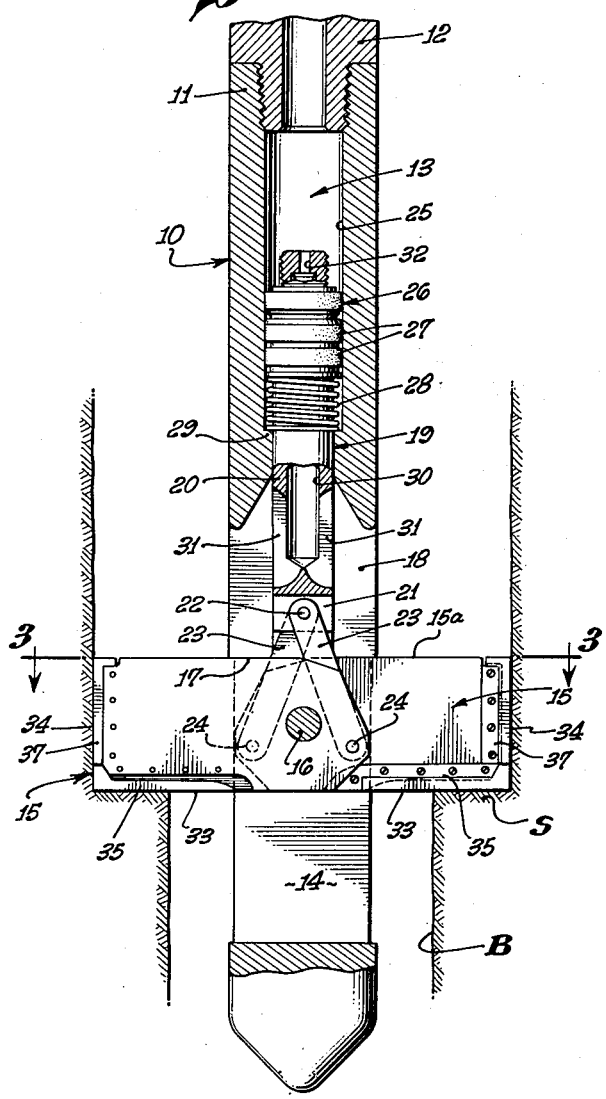
Figure 1 is a longitudinal section through an expansible rotary drill bit or rotary underreamer, with its cutter blades in expanded position for operation in a well bore.
Figure 2:
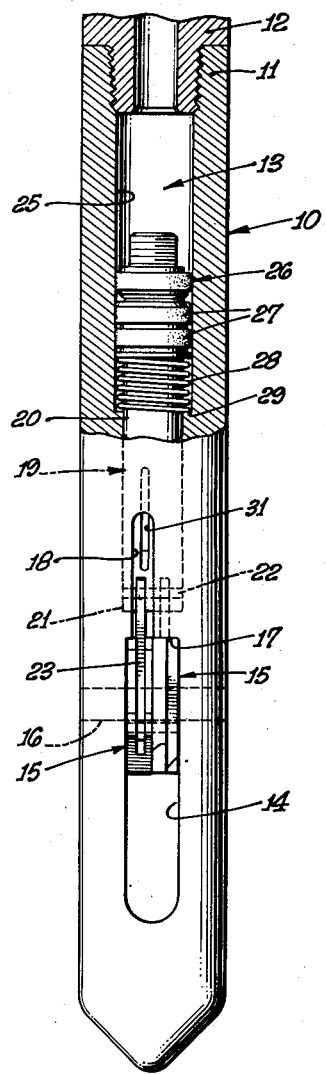
Fig. 2 is a side elevation, partly in section, of the drill bit shown in Fig. 1.
Figure 3:
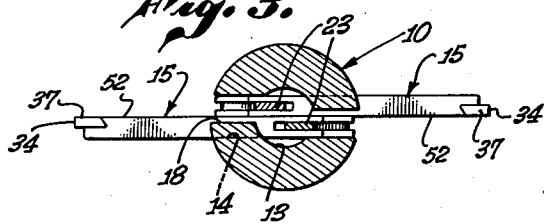
Fig. 3 is a cross-section taken along the line 3—3 on Fig. 1.

Underreamers of the type disclosed in the drawings are described in detail in the above-identified United States Patent No. 1,857,616. They include an elongate main supporting body 10 provided with an upper threaded box 11 attachable to the lower end of a string of drill pipe 12 or the like, by means of which the underreamer is lowered in the well bore and rotated in the performance of its underreaming operation. The body has a central longitudinal passage 13 therethrough, merging into an elongate slot 14 extending transversely through the body. A pair of cutter blades 15 of the drag type are movable within the slot, being mounted upon a hinge pin 16 extending through the body and across its slot.

The cutters 15 have an initial downward position substantially completely retracted within the confines of the body 10, and are swingable outwardly in opposite directions to extend beyond the periphery of the body, occupying a generally horizontal position, with their upper sides 15a engaging the upper shoulders 17 of the longitudinal slot 14. A set of longitudinal slots 18 extend upwardly to one side of and above the stop shoulders 17 at the ends of the main slot 14, to provide passages through which drilling fluid may pass for discharge onto the cutter blades 15.

The blades are swingable inwardly and outwardly of the body slots 14 in response to upward and downward movement of an operating plunger 19 slidable within the central passage 13 of the main body. This plunger includes a tubular plunger body 20 having depending legs 21 in its lower end for receiving a pivot pin 22, in which the upper ends of a pair of links 23 are pivotally mounted between the legs. The lower end of each link is pivotally attached to a cutter blade 15 by means of a pin 24. It is to be noted that the links 23 are pivoted to the blades on opposite sides of the hinge pin 16, in order that downward movement of the plunger 19 pivots the blades 15 oppositely in upward and outward directions. Such outward movement may continue, as aforementioned, until the blades occupy horizontal positions in contact with the body shoulders 17.

The upper end of the body passage 13 is enlarged in diameter to form a cylinder 25 slidably receiving the upper piston portion 26 of the plunger, which is also enlarged to a diameter greater than the lower plunger body portion 20. A plurality of piston rings 27, of rubber or similar material, are mounted on the piston for slidable sealing engagement with the wall of the cylinder 25 to prevent leakage in both directions around the piston. A spring 28 encircles the smaller diameter plunger body portion 20, one end engaging the lower end 29 of the cylinder and its other end engaging the piston 26. This spring is under compression and tends to elevate the plunger 19 and retract and maintain the blades 15 in their inward position within the confines of the body 10.

The plunger 19 is movable downwardly and the blades expand outwardly by the pressure of fluid, like drilling mud, pumped downwardly through the string of drill pipe 12, and acting upon the piston 26. Since it is desired to discharge the drilling fluid onto the cutters 15, to maintain them free of detritus, the fluid continues downwardly through a central passage 30 in the plunger 19 for discharge in opposite directions through elongate slots 31 in the lower portion of the plunger body, and through the upper body slots 18 onto the forward cutting faces of the cutter blades. In view of this discharge of fluid, an orifice or restriction 32 is provided in the plunger passage 30 to enable a back pressure to be built up on the high pressure side of the piston 26, sufficient in value to overcome the compressive force of the spring 28, shift the plunger 19 downwardly, and swing the blades 15 outwardly, through the agency of the pin and link connections 22, 23, 24 between the plunger 19 and blades 15.

Each cutter blade 15 has a lower cutting edge 33 for operation upon the transverse shoulder S formed in the well bore B during the hole-enlarging operation, as well as a side or outer cutting edge 34 for maintaining the hole to the required gauge.

The lower cutting edge 33 is provided on a lower insert 35 that is detachably secured to the main body 36 of the blade. Similarly, the outer edge 34 is provided on an outer insert 37 that is detachably secured to the main body of the blade. As illustrated in the drawings, the lower portion of each blade body, when the latter is in its expanded and horizontal position, is provided with a lower recess 38 which extends from the outer edge of the body inwardly to a substantial extent. This lower recess is defined by a back wall 39 and by an upper wall 40 that preferably makes an acute angle with the back wall, in effect, forming a generally V-shaped groove 41. Sharp corners are preferably avoided by the provision of a radius 42 between the back and inner walls. The upper wall 40 of the lower recess extends generally parallel to the outer lower edge 43 of the blade body, its inner portion 40a curving in a downward direction until it meets the inner lower edge portion 44 of the body 36. The outer edge portion 43 of each blade body is disposed above the inner edge portion 44, for a purpose to be mentioned below.

In a similar fashion, an outer recess 45 is formed in the blade body, being defined by a back wall 46 and an inner wall 47 inclined to the back wall, these walls being interconnected by a radius portion 48. The width of the back wall 46 of the outer recess 45 may be substantially the same as the width of the back wall 39 of the outer portion of the lower recess 38.

The cutter blade inserts 35, 37 are disposed within the recesses 38, 45 and are firmly secured to the blade body 36. Thus, the lower blade 35 insert has a back wall 49 and an upper inclined wall 50 and radius portion 51 engaging the corresponding portions of the blade body recess 38. The insert 35 has substantially the same thickness as the distance of the back wall 39 from the flat leading face 52 of the blade body, but is wider than the back wall 39, so as to depend below the edge of the blade body by a substantial extent 53. The inner portion 35a of each insert is curved to conform to the curved inner end 40a of the recess 38.

The lower insert 35 is secured to the main body 36 of the blade by a plurality of cap screws 54 extending through the insert and threaded into holes 55 provided in the blade body. The insert has counterbored portions 56 for receiving the heads 57 of the screws, the screws themselves being prevented from loosening by means of suitable lock washers 58 disposed between the screw heads and the bases of the counterbores 56.

The outer blade insert 37 is mounted within the outer recess 45, this insert also having a back wall 59 and an inner inclined wall 59a conforming to the corresponding walls 46, 47 in the blade body. The lower end of this insert 37 is disposed immediately above the outer portion of the lower insert 35, the outer cutting edge 34 of the insert 37 being substantially in alignment with the outer end of the lower insert 35. The outer insert is also secured to the blade body by a plurality of cap screws 54 in the same manner as the lower insert 35. The width of the outer insert is substantially greater than the width of the back wall 46; so that the insert 37 overhangs such back wall by a considerable amount 60.

The flat forward faces 61 of the inserts, when the inserts are assembled on the blade body 36, in effect form a continuation of the flat leading face 52 of the blade body. Hardfacing material 62 is welded to the forward outer marginal portions of the inserts. As disclosed in the drawings, each insert is provided with a recess 63 in which hardfacing material 62 may be disposed and welded to the insert material. As an example, tungsten carbide peas may be welded with a mild steel rod to each insert within the recess. Tungsten carbide of a suitable mesh (say 8 to 56 mesh), contained in a suitable tubular rod, may be welded over the faces of the peas. The welded surface may then be suitably ground so that the hardfacing material forms a continuation of the faces 61 of the inserts.

When the blades are in their retracted positions, they are confined substantially entirely within the confines of the main bit body 10. Upon lowering the tool on the drill pipe string 12 in the well bore B to the desired location at which the hole-enlarging operation is to commence, drilling mud, or other fluid, is pumped down the drill pipe and into the bit body, this fluid acting on the plunger 19 and urging it in a downward direction, swinging the blades 15 outwardly about the hinge pin 16. While pressure is being applied to the fluid in the apparatus, the drill pipe string 12 and drill bit connected thereto are rotated, causing the upper corner 34a of the outer blade insert 37 to dig into the wall of the formation. Drilling continues until the blades have assumed their horizontal position, disclosed in Fig. 1, whereupon down weight can be imposed on the drill string 12 and bit, to cause the lower cutter inserts 35 to form and operate upon the formation shoulder S during rotation of the tool. The hardfaced material 62 on the lower and outer inserts 35, 37 operate upon the formation shoulder and the side wall of the enlarged hole to cut away the formation material, the cuttings being conducted by the drilling fluid to the top of the well bore.

It is to be noted that the blade inserts 35, 37 extend beyond the lower and outer edges 43, 43a of the blade body 36 and present a substantially lesser thickness of material for bearing upon the formation shoulder S and the wall of the well bore. As the blade inserts become worn, the overhanging distances 53, 61 of the inserts with respect to the blade body decreases, but despite this fact, the thickness of the inserts remains the same; so that there is no increased area presented to the formation upon which the drilling weight is imposed. Accordingly, the drilling weight can remain substantially constant for a particular formation during the entire useful life of the drilling blade inserts 35, 37.

It is also to be noted that the tungsten carbide hardfacing material 62 extends beyond the lower and outer edges 43, 43a of the body 36 by at least the same amount as the inserts 35, 37 themselves. Accordingly, the inserts can be worn away down to the blade body material itself, before the blade has lost its useful cutting life, requiring withdrawal of the underreamer to the top of the well bore.

The cap screws 54 are sufficient to hold the inserts in assembled position on the blade body, and to withstand the drilling weight and torque imposed upon the blades 15 and the inserts 35, 37 during the entire useful life of the blades. However, by disposing the upper wall 40 of the lower body recess 38 and the inner wall 47 of the outer body recess 45 at acute angles to the respective back walls 39, 46 of the recesses, and by conforming the inner portions 49, 50, 51 and 59, 59a of the inserts to such walls, substantial strains are removed from the cap screws. Thus, the down weight or drilling weight imposed on the insert 35 is transmitted from the insert to the upper recess wall 40 to the blade body. Similarly, during rotation of the blades, any tendency of each insert to tilt outwardly in the recess is resisted by engagement of the inner inclined surface 50 of the insert with the upper wall 40 of the blade. In a similar fashion, any inward forces imposed upon the outer insert 37 is transmitted directly to the inclined inner wall 47 of the recess, such inclined inner wall tending to hold the blade inwardly against the back wall 46. Any tilting tendency that the insert may have, due to its overhang beyond the outer edge 43a of the blade body, is also resisted by the inclined inner wall 47.

When the inserts become worn, the tool is removed to the top of the well bore, the inserts being removed by the simple expedient of removing the cap screws 54, and new inserts mounted in their place.

Inasmuch as the effective portions of the inserts operable upon the formation remains of constant thickness as wear on the inserts occurs, the blades stay sharper longer and enable a greater footage to be drilled. When the inserts have become worn, it is only necessary to replace them. It is unnecessary to rebuild an entire cutting blade, which would be the case if the hardfacing material were welded directly upon the blade body 36. Not only would rebuilding and rehardfacing be necessary, but the entire blade body would then require heat treatment, to develop appropriate physical characteristics in it. As a result, the insert arrangement provides a cheaper construction, capable of drilling greater footage.

During rotation of the drill bit, the blades 15 are subjected to substantial bending stresses. If bending of a blade were to occur, it would be impossible to retract it into the body slot 14, precluding removal of the drill bit from the well bore. Because of the composite blade construction disclosed, the blade body 36 may be made of harder materials, possessing increased impact resistance and less subject to bending, and, for that matter, breaking before bending. Breaking of a blade may leave a part of the blade in the well bore, but it would not prevent retraction of the remaining portion of the blade into the bit body and removal of substantially the entire tool to the top of the well bore.

It is to be noted that the blade body 36 is of substantial thickness, being of much greater thickness than that of each blade insert 35, 37. Because of such thickness, the blade body should be made of an alloy steel which has greater hardenability. Such alloy steels that possess greater hardenability do not possess appropriate weldability for insuring a good bond of tungsten carbide, or other hardfacing materials, to them. However, since the hardfacing material is not welded to the blade body 36, the proper selection can be made of an alloy steel having the desired hardenability characteristics. As an example, the body of the blade can be made from a nickel chromium molybdenum alloy steel, such as SAE No. 4340, in which the hardness can be brought to the proper and desired value upon heat treatment throughout substantially the entire thickness of the blade, despite the fact that the blade may be of substantial thickness, of say 1⅝ inches, as is sometimes necessary in hardfaced bits. Another alloy steel may be a chromium molybdenum steel having a comparatively high carbon content, for example, SAE No. 4147. It is not possible to obtain the desired hardness throughout the thickness of the blade body with other alloy steels that have the proper weldability characteristic.

While reference has been made to avoidance of bending of the blades 15, it is also important to avoid bending of the inserts. The acute angle relationship between the inserts and the blade body will cause the body 36 to resist bending of the inserts 35, 37. However, the insert material can also be selected that will have the proper hardenability, as well as the desired weldability characteristic. Since the insert is much thinner than the body of the blade, it is possible to select a material that has good weldability characteristic, and in which the hardness can still be brought to the desired value throughout the thickness of the insert, inasmuch as the heat treatment must penetrate through a lesser cross-section. As an example, each insert 35, 37 may be made of a chromium molybdenum alloy steel, such as SAE No. 4130. The use of this same alloy steel for the blade body would not provide a proper hardness throughout the body, since the heat treatment would not penetrate the much heavier cross-section blade body throughout its entire thickness, which penetration can be attained when a nickel chromium molybdenum steel alloy is used for the blade body material.

Accordingly, the composite blade construction not only has a longer useful life in the well bore, and is more economical to manufacture and maintain, but allows a selection of materials to be made that are best suited to the loads to which the composite blade is subjected. The inserts 35, 37 may be made from a material having the proper weldability characteristic, as well as the proper hardenability characteristic, bearing in mind the thickness of the insert. The main body 36 of the blade can be made from a material having the proper hardenability, despite its much greater thickness; so as to insure the proper grain structure that will produce the required hardness and impact resistance throughout the entire thickness of the blade body. Accordingly, the body of the blade will not bend, but, instead, will break upon being subjected to extreme torques.

The inventors claim:

1. A cutter blade for a rotary drill bit including an alloy steel body having a recess along one of its marginal portions; a separate alloy steel cutter element in said recess; means detachably securing said element to said body; hardfacing material welded to the leading face of said element; the chemical analysis of said body steel being different from that of said cutter element steel such that the alloy steel of said body has greater hardenability characteristics and hardness than the alloy steel of said element but lacks sufficient weldability characteristics to have the hardfacing material welded firmly thereto, and said cutter element has a lesser capability of being hardened than said blade body, but has a weldability characteristic such that the hardfacing material is securely welded thereto, whereby said blade body will break before bending.

2. A cutter blade for a rotary drill bit including a nickel chromium molybdenum alloy steel body having a recess along one of its marginal portions; a separate chromium molybdenum alloy steel cutter element in said recess; means detachably securing said element to said body; and hardfacing material welded to the leading face of said element; said blade body having greater hardenability characteristics and hardness than said cutter element but lacking sufficient weldability characteristics to have the hardfacing material welded firmly thereto, and said cutter element having a lesser capability of being hardened than said blade body, but having a weldability characteristic such that the hardfacing material is securely welded thereto, whereby said blade body will break before bending.

3. A cutter blade for a rotary drill bit including an alloy steel body having a recess along one of its marginal portions; a separate alloy steel cutter element in said recess; means detachably securing said element to said body; hardfacing material welded to the leading face of said element; said body and element being composed of a chromium molybdenum alloy steel, the steel of said body having a substantially greater carbon content than the steel of said element; said blade body having greater hardenability characteristics and hardness than said cutter element but lacking sufficient weldability characteristics to have the hardfacing material welded firmly thereto, and said cutter element having a lesser capability of being hardened than said blade body, but having a weldability characteristic such that the hardfacing material is securely welded thereto, whereby said blade body will break before bending.

4. A cutter blade for a rotary drill bit including an alloy steel body having a recess of extended length along one of its marginal portions which occupies a lower position on said blade body, said recess terminating in an upward groove portion; a separate alloy steel cutter element in said recess and its groove portion; means detachably securing said element to said blade body; hardfacing material welded to the leading face of said element; the chemical analysis of said blade body steel being different from that of said cutter element such that said blade body has greater hardenability characteristics and hardness than said cutter element but lacks sufficient weldability characteristics to have the hardfacing material welded firmly thereto, and said cutter element has a lesser capability of being hardened than said blade body, but has a weldability characteristic such that the hardfacing material is securely welded thereto, whereby said blade body will break before bending; said cutter element having a cutting edge substantially parallel to the upper groove portion of said recess.

5. A cutter blade for a rotary drill bit including an alloy steel body having a recess of extended length along one of its marginal portions which occupies a lower position on said blade body, said recess being defined by a back wall and an upper wall inclined forwardly in a downward direction; a separate alloy steel cutter element in said recess, said element having back and upper walls conforming to and adjacent said back and upper walls defining said cutter body recess; means detachably securing said element to said blade body; hardfacing material welded to the leading face of said element; the chemical analysis of said blade body steel being different from that of said cutter element such that said blade body has greater hardenability characteristics and hardness than said cutter element but lacks sufficient weldability characteristics to have the hardfacing material welded firmly thereto, and said cutter element has a lesser capability of being hardened than said blade body, but has a weldability characteristic such that the hardfacing material is securely welded thereto, whereby said blade body will break before bending; said cutter element having a lower cutting edge substantially parallel to said upper walls.

6. A cutter blade for a rotary drill bit including an alloy steel body having recesses along its marginal portions which occupy lower and outer positions on said blade body, said lower recess terminating in an upper groove portion and said outer recess terminating in an inner groove portion; a separate alloy steel cutter element in said lower recess and its groove portion; a separate alloy steel cutter element in said outer recess and its groove portion; means detachably securing said elements to said blade body; hardfacing material welded to the leading faces of said elements; the chemical analysis of said blade body steel being different from that of said cutter elements such that said blade body has greater hardenability characteristics and hardness than said cutter elements but lacks sufficient weldability characteristics to have the hardfacing material welded firmly thereto, and said cutter elements have a lesser capability of being hardened than said blade body, but have a weldability characteristic such that the hardfacing material is securely welded thereto, whereby said blade body will break before bending; said cutter element in said lower recess having a cutting edge substantially parallel to said upper groove portion; said cutter element in said outer recess having a cutting edge substantially parallel to said inner groove portion.

7. A cutter blade for a rotary drill bit including an alloy steel body having a recess along one of its marginal portions terminating in a groove; a separate alloy steel cutter element in said recess and groove; means detachably securing said element to said blade body; hardfacing material welded to said element; the chemical analysis of said blade body steel being different from that of said cutter element such that said blade body has greater hardenability characteristics and hardness than said cutter element but lacks sufficient weldability characteristics to have the hardfacing material welded firmly thereto, and said cutter element has a lesser capability of being hardened than said blade body, but has a weldability characteristic such that the hardfacing material is securely welded thereto, whereby said blade body will break before bending; said cutter element having a cutting edge substantially parallel to said groove.

8. A cutter blade for a rotary drill bit including an alloy steel body having recesses along its lower and outer marginal portions; a separate alloy steel cutter element in said lower recess; a separate alloy steel cutter element in said outer recess; means detachably securing said elements to said body; hardfacing material welded to the leading faces of said elements; the chemical analysis of said blade body steel being different from that of said cutter elements such that said blade body has greater hardenability characteristics and hardness than said cutter elements but lacks sufficient weldability characteristics to have the hardfacing material welded firmly thereto, and said cutter elements have a lesser capability of being hardened than said blade body, but have a weldability characteristic such that the hardfacing material is securely welded thereto, whereby said blade body will break before bending.

JOHN R. BAKER.
EARNEST H. CLARK, Jr.

References Cited in the file of this patent

UNITED STATES PATENTS

| Number | Name | Date |
| --- | --- | --- |
| 1,510,222 | Herman | Sept. 30, 1924 |
| 1,597,143 | Carter | Aug. 24, 1926 |
| 1,857,616 | Baker | May 10, 1932 |
| 1,923,488 | Howard et al. | Aug. 22, 1933 |
| 2,019,934 | Schroter et al. | Nov. 5, 1935 |
| 2,348,262 | Oak et al. | May 9, 1944 |

FOREIGN PATENTS

| Number | Country | Date |
| --- | --- | --- |
| 330,433 | Great Britain | June 12, 1930 |
| 552,382 | Great Britain | Apr. 5, 1943 |